(12) United States Patent
Dickey

(10) Patent No.: US 6,732,531 B2
(45) Date of Patent: May 11, 2004

(54) COMBUSTION SYSTEM FOR A GAS TURBINE ENGINE WITH VARIABLE AIRFLOW PRESSURE ACTUATED PREMIX INJECTOR

(75) Inventor: James B. Dickey, Simi Valley, CA (US)

(73) Assignee: Capstone Turbine Corporation, Chatsworth, CA (US)

( * ) Notice: Subject to any disclaimer, the term of this patent is extended or adjusted under 35 U.S.C. 154(b) by 0 days.

(21) Appl. No.: 10/101,032

(22) Filed: Mar. 18, 2002

(65) Prior Publication Data

US 2002/0178735 A1 Dec. 5, 2002

Related U.S. Application Data

(60) Provisional application No. 60/276,351, filed on Mar. 16, 2001.

(51) Int. Cl.[7] ................................................. F02C 9/16
(52) U.S. Cl. .......................................... 60/794; 60/740
(58) Field of Search ................................ 60/39.23, 740, 60/794, 804

(56) References Cited

U.S. PATENT DOCUMENTS

| | | | | |
|---|---|---|---|---|
| 2,655,787 | A | * 10/1953 | Brown | .................. 60/39.23 |
| 3,548,565 | A | * 12/1970 | Toesca | ..................... 60/772 |
| 3,728,859 | A | * 4/1973 | Seiler | .................. 60/39.23 |
| 3,937,013 | A | * 2/1976 | Aspinwall | ................ 60/804 |
| 5,685,156 | A | 11/1997 | Willis et al. | |
| 5,850,732 | A | * 12/1998 | Willis et al. | .............. 60/804 |
| 5,894,720 | A | 4/1999 | Willis et al. | |
| 6,016,658 | A | 1/2000 | Willis et al. | |
| 6,023,135 | A | 2/2000 | Gilbreth et al. | |
| 6,405,522 | B1 | 6/2002 | Pont et al. | |
| 6,438,937 | B1 | 8/2002 | Pont et al. | |
| 6,453,658 | B1 | 9/2002 | Willis et al. | |
| 6,487,096 | B1 | 11/2002 | Gilbreth et al. | |
| 6,539,720 | B2 | 4/2003 | Rouse et al. | |
| 2002/0104316 | A1 | 8/2002 | Dickey et al. | |
| 2002/0148229 | A1 | 10/2002 | Pont et al. | |

* cited by examiner

Primary Examiner—Louis J. Casaregola
(74) Attorney, Agent, or Firm—Sterne, Kessler, Goldstein & Fox P.L.L.C.

(57) ABSTRACT

The present disclosure provides a turbogenerator system having a turbine mounted for rotation on a shaft, a motor/generator coupled with the shaft for rotation therewith. A combustor for combusting fuel and compressed air to generate combustion gases for rotating the turbine is provided as well as a compressor providing compressed air, and an injector having at least one opening to admit the compressed air from the compressor. The injector may be connected to the combustor to inject fuel and compressed air into the combustor. A piston slidably covering the at least one opening in the injector provides a variable entry to the compressed air, and a pressure actuator associated with the piston and responsive to pressure in the combustor is used for determining the size of the variable entry. It is emphasized that this abstract is provided to comply with the rules requiring an abstract which will allow a searcher or other reader to quickly ascertain the subject matter of the technical disclosure. It is submitted with the understanding that it will not be used to interpret or limit the scope or meaning of the claims.

25 Claims, 16 Drawing Sheets

US 6,732,531 B2

COMBUSTION SYSTEM FOR A GAS TURBINE ENGINE WITH VARIABLE AIRFLOW PRESSURE ACTUATED PREMIX INJECTOR

RELATED APPLICATIONS

This patent application claims the priority of provisional patent application serial No. 60/276,351, filed Mar. 16, 2001.

TECHNICAL FIELD

This invention relates to the general field of combustion systems and more particularly to a combustion system for a small gas turbine engine including variable airflow pressure actuated premix injectors.

BACKGROUND OF THE INVENTION

In a small gas turbine engine, inlet air is continuously compressed, mixed with fuel in an inflammable proportion, and then contacted with an ignition source to ignite the mixture that will then continue to burn. The heat energy thus released then flows in the combustion gases to a turbine where it is converted to rotary energy for driving equipment such as an electrical generator. The combustion gases are then exhausted to atmosphere after giving up some of their remaining heat to the incoming air provided from the compressor.

Quantities of air greatly in excess of stoichiometric amounts are normally compressed and utilized to keep the combustor liner cool and dilute the combustor exhaust gases so as to avoid damage to the turbine nozzle and blades. Generally, primary sections of the combustor are operated near stoichiometric conditions which produce combustor gas temperatures up to approximately four thousand (4,000) degrees Fahrenheit. Further along the combustor, secondary air is admitted which lowers the fuel-air ratio (FAR) and lowers the gas temperatures so that the gases exiting the combustor are in the range of two thousand (2,000) degrees Fahrenheit.

It is well established that NOx formation is thermodynamically favored at high temperatures and the NOx formation reaction is highly temperature dependent. Operating the combustion process in a very lean condition (i.e., high excess air) is one of the simplest ways of achieving lower temperatures and hence lower NOx emissions. Very lean ignition and combustion, however, inevitably result in incomplete combustion and the attendant emissions that result therefrom. In addition, combustion processes are difficult to sustain at these extremely lean operating conditions. Further, it is difficult in a small gas turbine engine to achieve low emissions over the entire operating range of the turbine.

What is needed is a technique for decreasing the peak combustion temperature and limiting the residence time of the combustion products in the combustion zone to provide an effective means of reducing NOx emissions from gas turbine engines.

What is needed is an injector that allows operation of a combustion system over a wide range of operating conditions and minimizes emissions from the system.

SUMMARY OF THE INVENTION

In a first aspect, the present disclosure provides a turbogenerator system having a turbine mounted for rotation on a shaft, a motor/generator coupled with the shaft for rotation therewith, a combustor for combusting fuel and compressed air to generate combustion gases for rotating the turbine, a compressor providing compressed air, and an injector having at least one opening to admit the compressed air from the compressor, the injector connected to the combustor to inject fuel and compressed air into the combustor, a piston slidably covering the at least one opening providing a variable entry to the compressed air, and a pressure actuator associated with the piston and responsive to pressure in the combustor for determining size of the variable entry.

DETAILED DESCRIPTION OF THE PREFERRED EMBODIMENT(S)

Figure 1A:
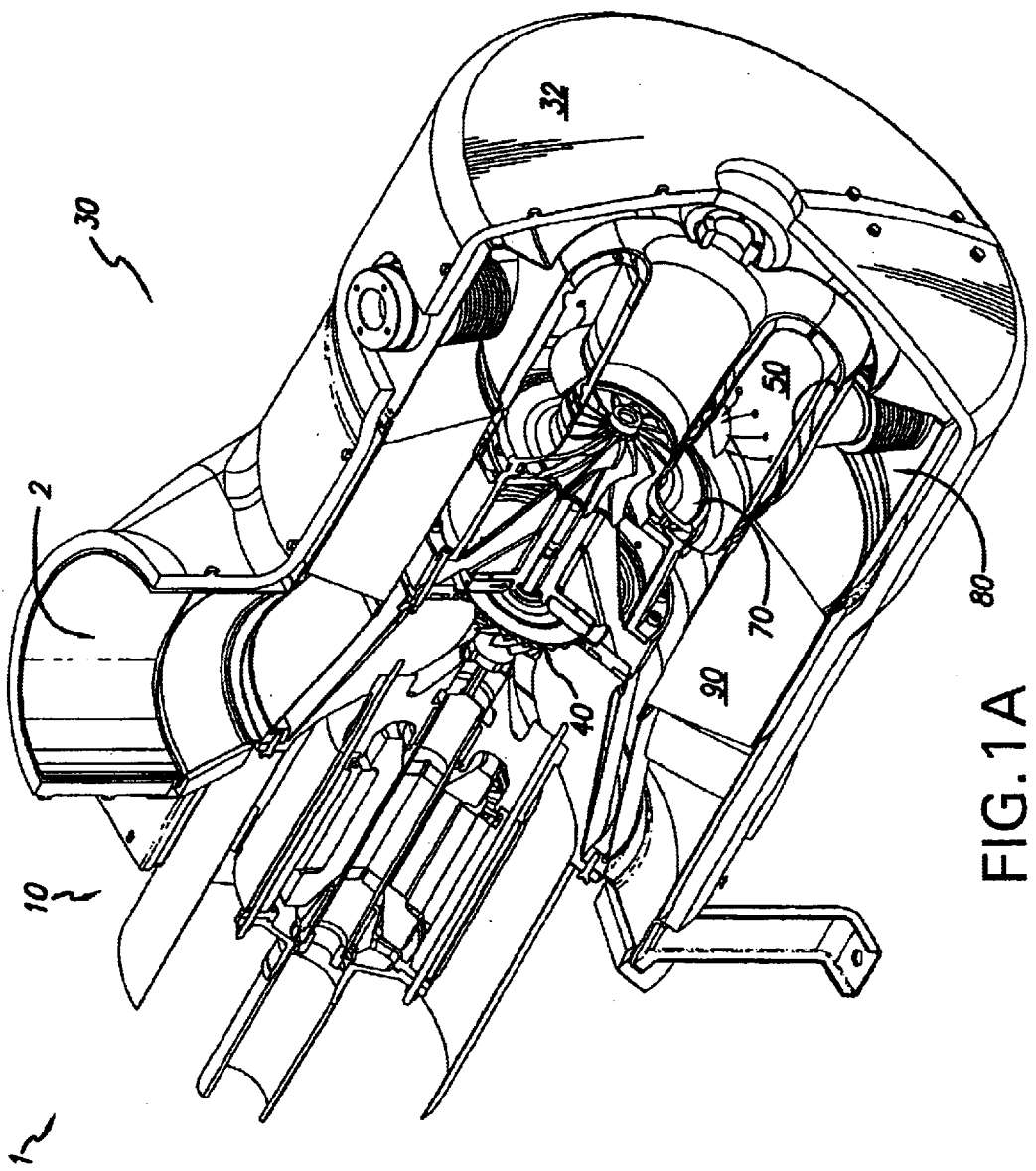
FIG. 1A is perspective view, partially in section, of an integrated turbogenerator system.

With reference to FIG. 1A, an integrated turbogenerator 1 according to the present disclosure generally includes motor/generator section 10 and compressor-turbine section 30. Compressor-turbine section 30 includes exterior can 32, compressor 40, combustor 50 and turbine 70. A recuperator 90 may be optionally included.

Figure 1B:
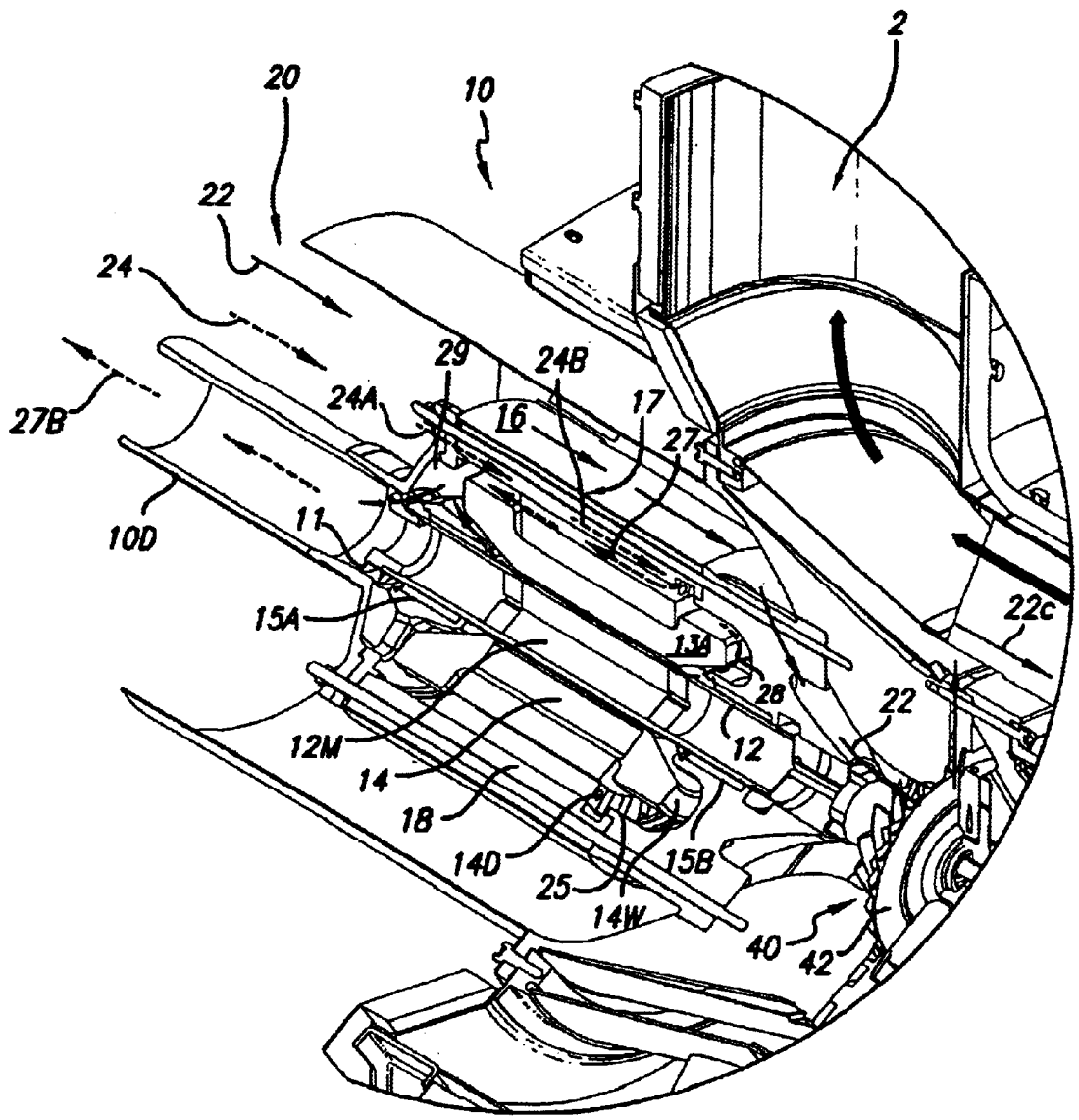
FIG. 1B is a magnified perspective view, partially in section, of the motor/generator portion of the integrated turbogenerator of FIG. 1A.
Figure 1C:
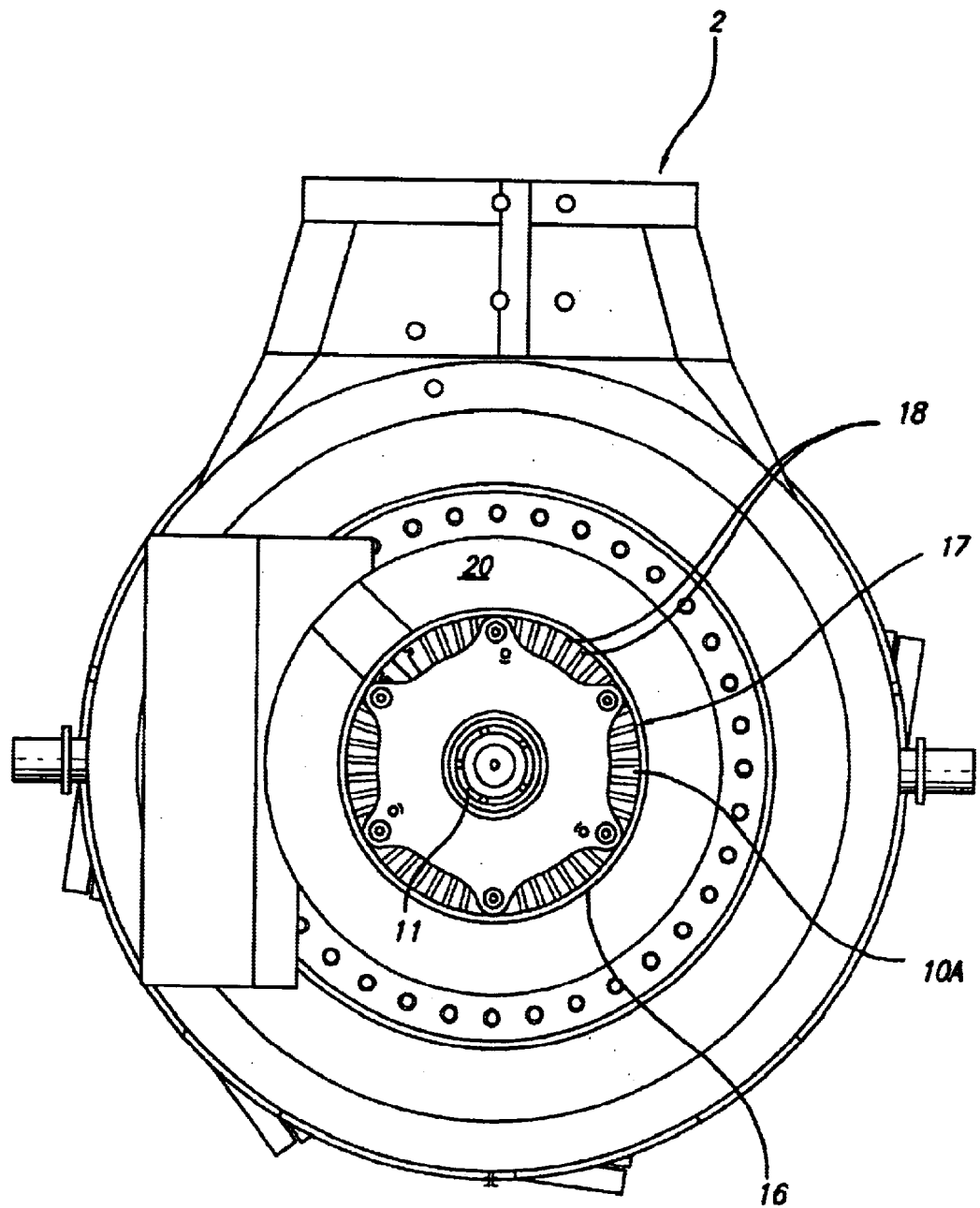
FIG. 1C is an end view, from the motor/generator end, of the integrated turbogenerator of FIG. 1A.

Referring now to FIG. 1B and FIG. 1C, in a currently preferred embodiment of the present disclosure, motor/generator section 10 may be a permanent magnet motor generator having a permanent magnet rotor or sleeve 12.

Any other suitable type of motor generator may also be used. Permanent magnet rotor or sleeve 12 may contain a permanent magnet 12M. Permanent magnet rotor or sleeve 12 and the permanent magnet disposed therein are rotatably supported within permanent magnet motor/generator stator 14. Preferably, one or more compliant foil, fluid film, radial, or journal bearings 15A and 15B rotatably support permanent magnet rotor or sleeve 12 and the permanent magnet disposed therein. All bearings, thrust, radial or journal bearings, in turbogenerator 1 may be fluid film bearings or compliant foil bearings. Motor/generator housing 16 encloses stator heat exchanger 17 having a plurality of radially extending stator cooling fins 18. Stator cooling fins 18 connect to or form part of stator 14 and extend into annular space 10A between motor/generator housing 16 and stator 14. Wire windings 14W exist on permanent magnet motor/generator stator 14.

Figure 1D:
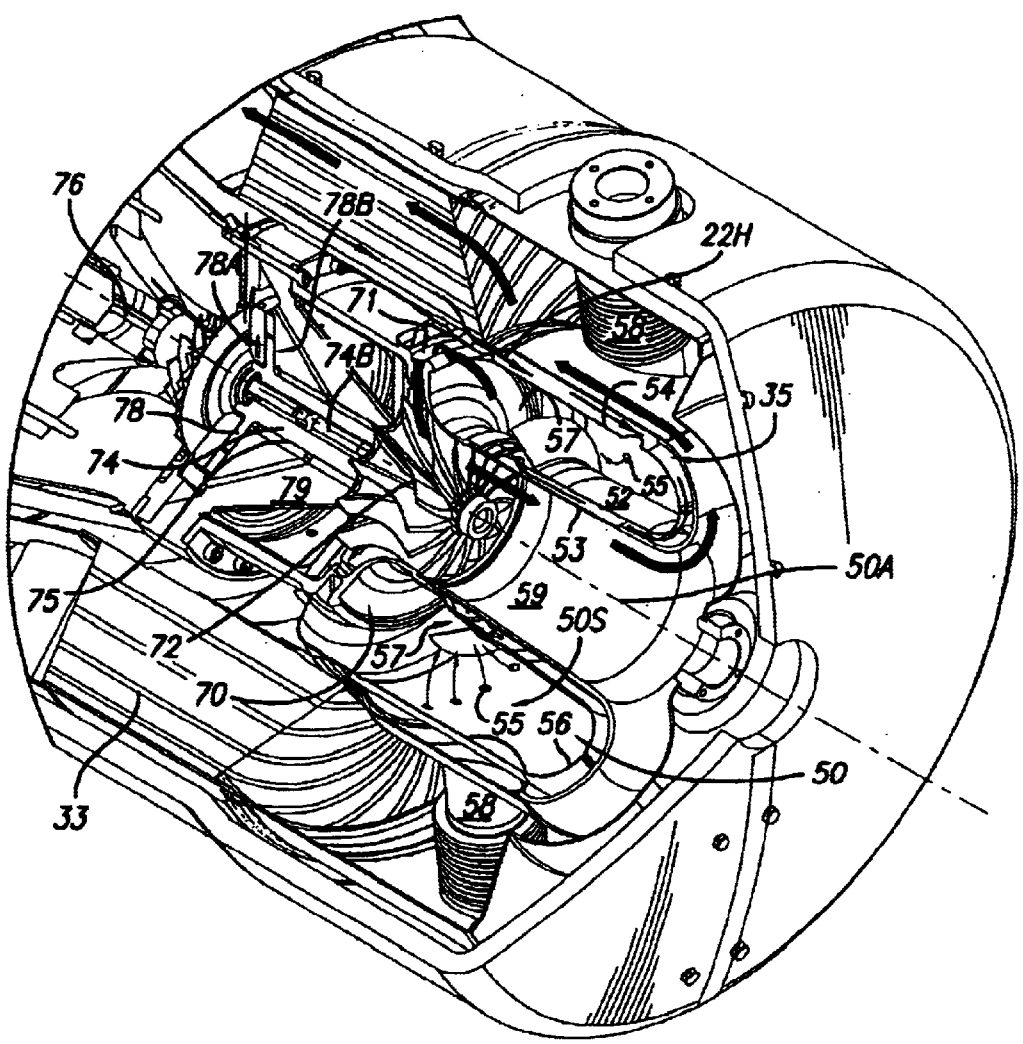
FIG. 1D is a magnified perspective view, partially in section, of the combustor-turbine exhaust portion of the integrated turbogenerator of FIG. 1A.
Figure 2:
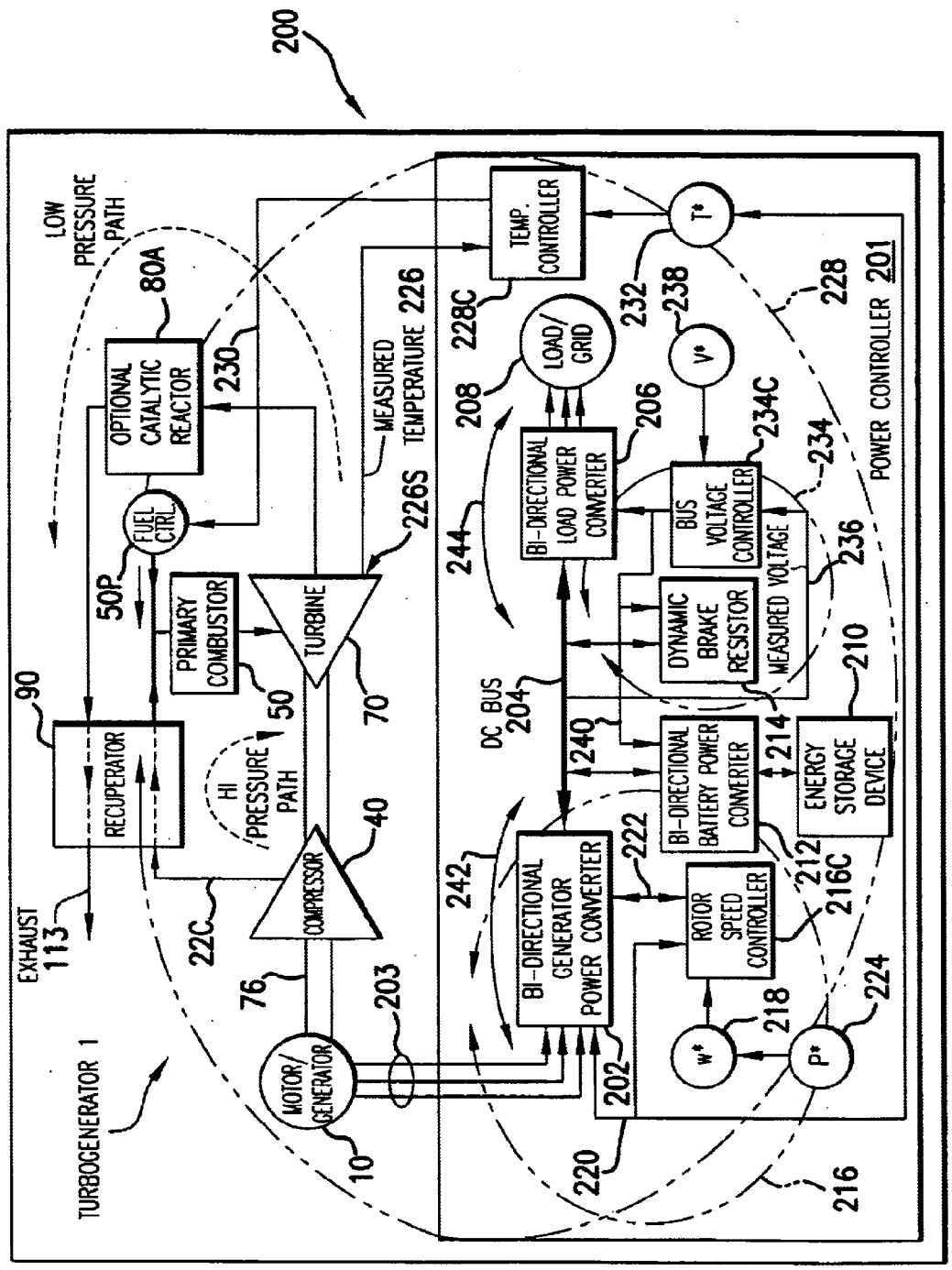
FIG. 2 is a block diagram schematic of a turbogenerator system including a power controller having decoupled rotor speed, operating temperature, and DC bus voltage control loops.
Figure 3:
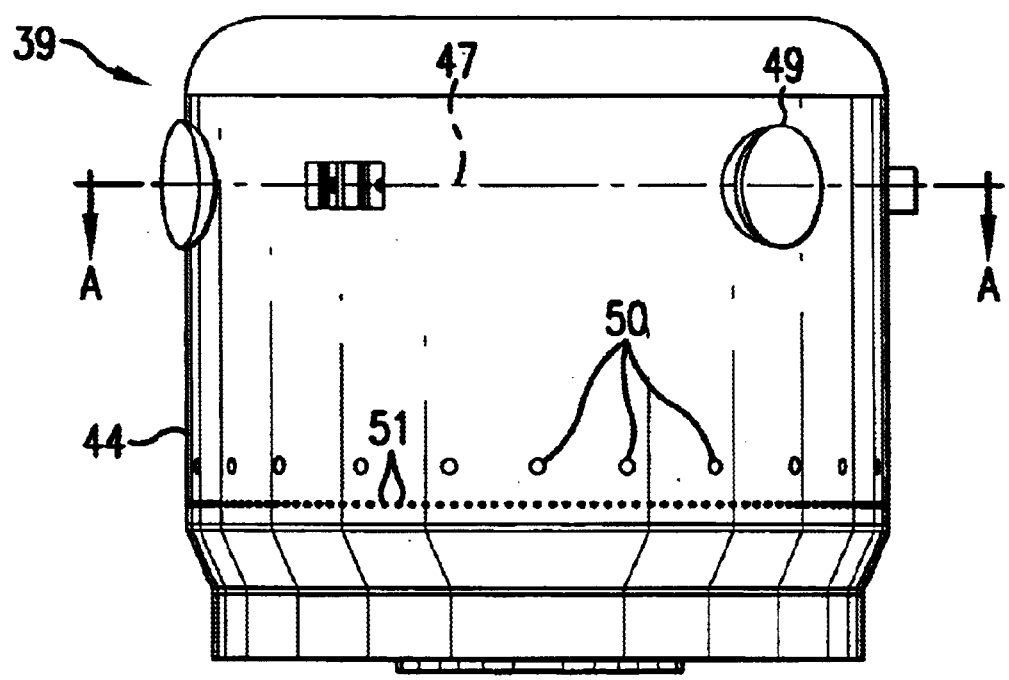
FIG. 3 is a side view of a combustor according to the present disclosure.
Figure 4:
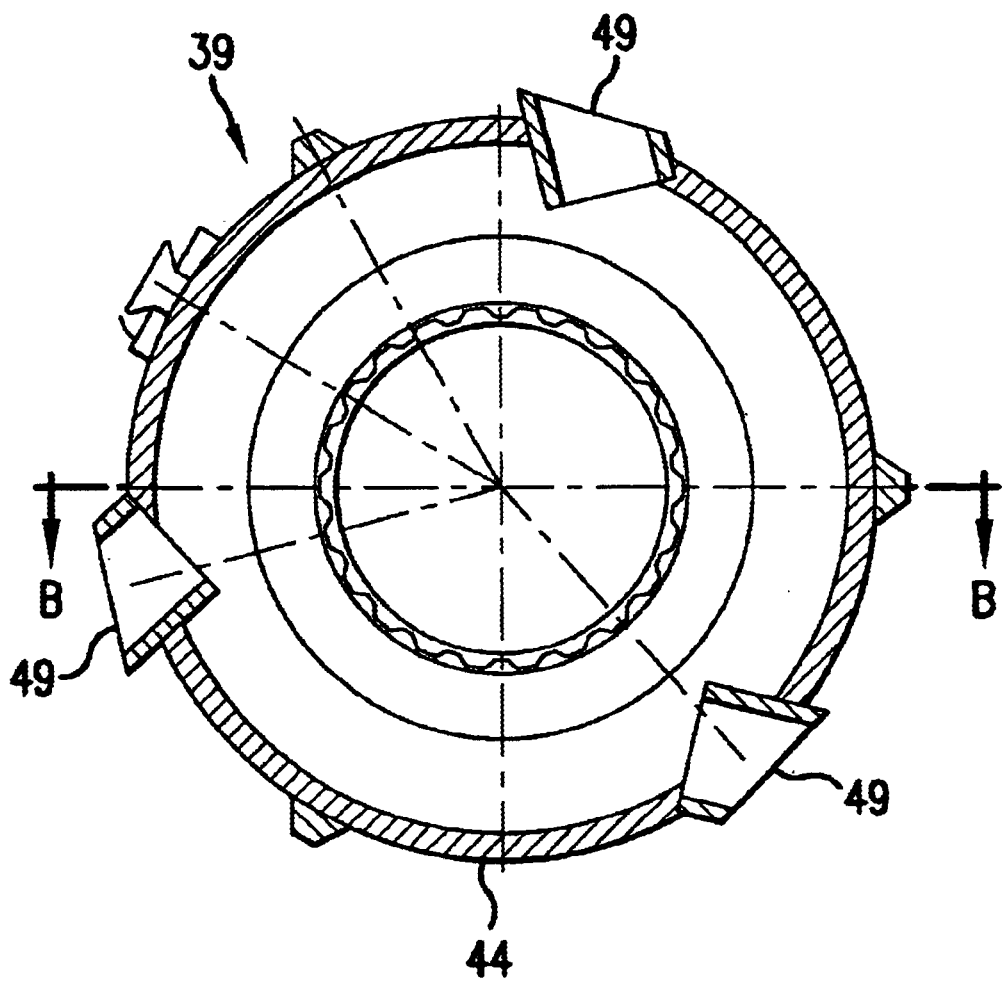
FIG. 4 is an end view cross section of the combustor of FIG. 3.
Figure 5:
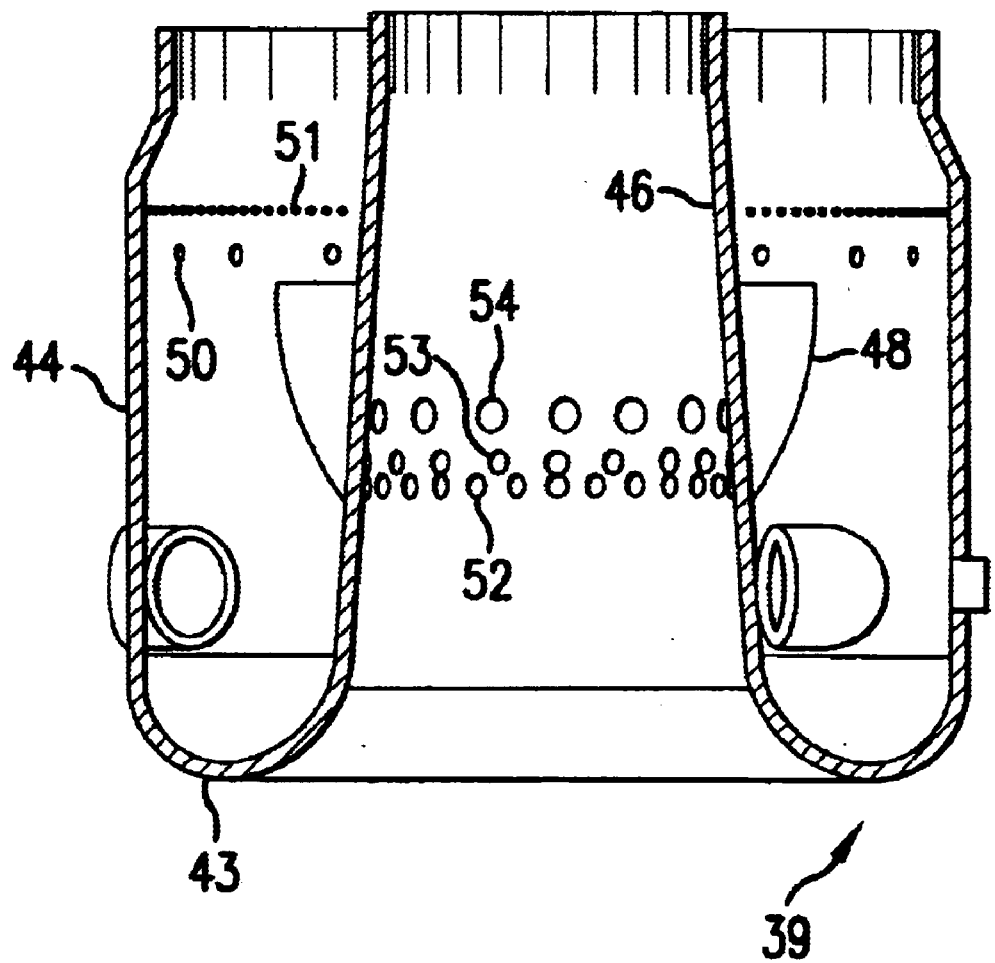
FIG. 5 is an side view cross section of the combustor of FIG. 3.

Referring now to FIG. 1D, combustor 50 may include cylindrical inner wall 52 and cylindrical outer wall 54. Cylindrical outer wall 54 may also include air inlets 55. Cylindrical walls 52 and 54 define an annular interior space 50S in combustor 50 defining an axis 50A. Combustor 50 includes a generally annular wall 56 further defining one axial end of the annular interior space of combustor 50. Associated with combustor 50 may be one or more fuel injector inlets 58 to accommodate fuel injectors which receive fuel from fuel control element 50P as shown in FIG. 2, and inject fuel or a fuel air mixture to interior of 50S combustor 50. Inner cylindrical surface 53 is interior to cylindrical inner wall 52 and forms exhaust duct 59 for turbine 70.

Turbine 70 may include turbine wheel 72. An end of combustor 50 opposite annular wall 56 further defines an aperture 71 in turbine 70 exposed to turbine wheel 72. Bearing rotor 74 may include a radially extending thrust bearing portion, bearing rotor thrust disk 78, constrained by bilateral thrust bearings 78A and 78B. Bearing rotor 74 may be rotatably supported by one or more journal bearings 75 within center bearing housing 79. Bearing rotor thrust disk 78 at the compressor end of bearing rotor 74 is rotatably supported preferably by a bilateral thrust bearing 78A and 78B. Journal or radial bearing 75 and thrust bearings 78A and 78B may be fluid film or foil bearings.

Turbine wheel 72, bearing rotor 74 and compressor impeller 42 may be mechanically constrained by tie bolt 74B, or other suitable technique, to rotate when turbine wheel 72 rotates. Mechanical link 76 mechanically constrains compressor impeller 42 to permanent magnet rotor or sleeve 12 and the permanent magnet disposed therein causing permanent magnet rotor or sleeve 12 and the permanent magnet disposed therein to rotate when compressor impeller 42 rotates.

Figure 1E:
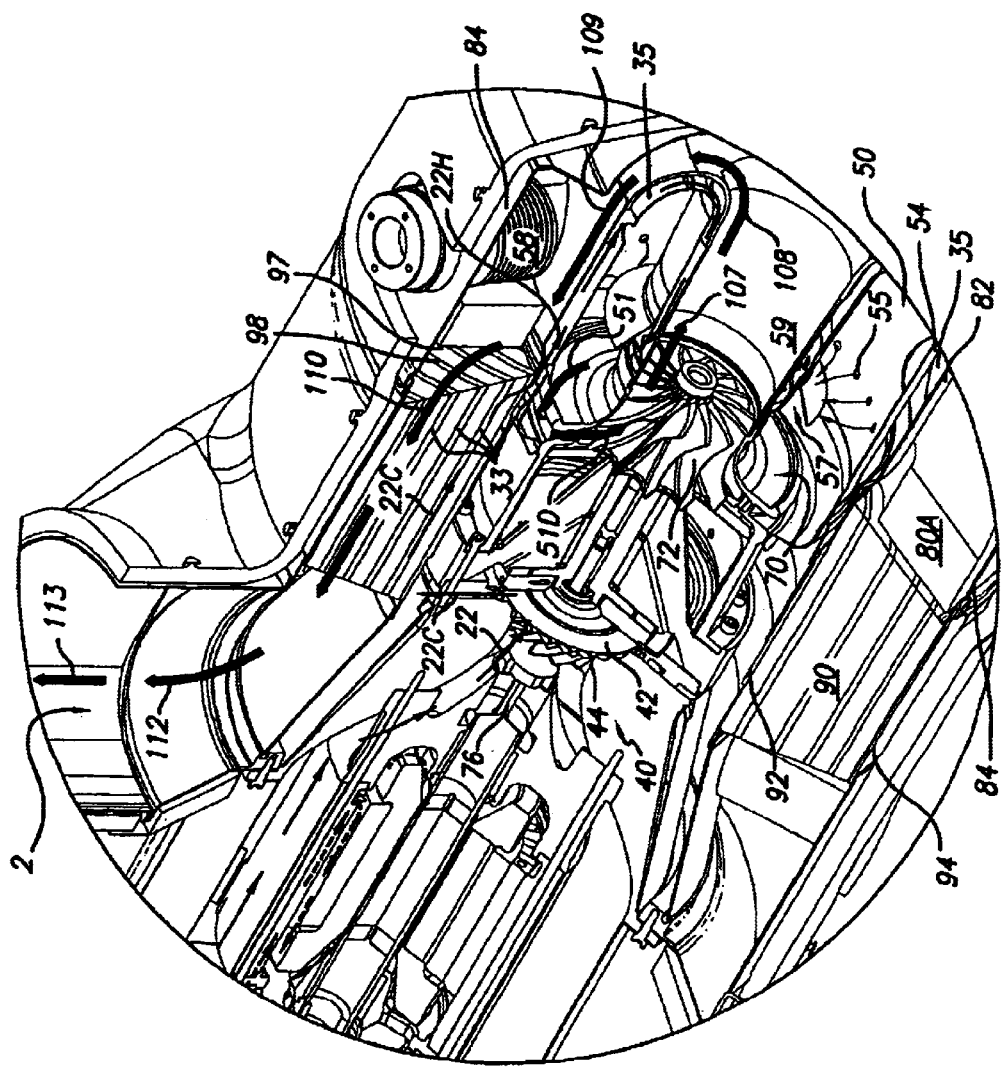
FIG. 1E is a magnified perspective view, partially in section, of the compressor-turbine portion of the integrated turbogenerator of FIG. 1A.

Referring now to FIG. 1E, compressor 40 may include compressor impeller 42 and compressor impeller housing 44. Recuperator 90 may have an annular shape defined by cylindrical recuperator inner wall 92 and cylindrical recuperator outer wall 94. Recuperator 90 contains internal passages for gas flow, one set of passages, passages 33 connecting from compressor 40 to combustor 50, and one set of passages, passages 97, connecting from turbine exhaust 80 to turbogenerator exhaust output 2.

Referring again to FIG. 1B and FIG. 1C, in operation, air flows into primary inlet 20 and divides into compressor air 22 and motor/generator cooling air 24. Motor/generator cooling air 24 flows into annular space 10A between motor/generator housing 16 and permanent magnet motor/generator stator 14 along flow path 24A. Heat is exchanged from stator cooling fins 18 to generator cooling air 24 in flow path 24A, thereby cooling stator cooling fins 18 and stator 14 and forming heated air 24B. Warm stator cooling air 24B exits stator heat exchanger 17 into stator cavity 25 where it further divides into stator return cooling air 27 and rotor cooling air 28. Rotor cooling air 28 passes around stator end 13A and travels along rotor or sleeve 12. Stator return cooling air 27 enters one or more cooling ducts 14D and is conducted through stator 14 to provide further cooling. Stator return cooling air 27 and rotor cooling air 28 rejoin in stator cavity 29 and are drawn out of the motor/generator 10 by exhaust fan 11 which is connected to rotor or sleeve 12 and rotates with rotor or sleeve 12. Exhaust air 27B is conducted away from primary air inlet 20 by duct 10D.

Referring again to FIG. 1E, compressor 40 receives compressor air 22. Compressor impeller 42 compresses compressor air 22 and forces compressed gas 22C to flow into a set of passages 33 in recuperator 90 connecting compressor 40 to combustor 50. In passages 33 in recuperator 90, heat is exchanged from walls 98 of recuperator 90 to compressed gas 22C. As shown in FIG. 1E, heated compressed gas 22H flows out of recuperator 90 to space 35 between cylindrical inner surface 82 of turbine exhaust 80 and cylindrical outer wall 54 of combustor 50. Heated compressed gas 22H may flow into combustor 54 through sidewall ports 55 or main inlet 57. Fuel (not shown) may be reacted in combustor 50, converting chemically stored energy to heat. Hot compressed gas 51 in combustor 50 flows through turbine 70 forcing turbine wheel 72 to rotate. Movement of surfaces of turbine wheel 72 away from gas molecules partially cools and decompresses gas 51D moving through turbine 70. Turbine 70 is designed so that exhaust gas 107 flowing from combustor 50 through turbine 70 enters cylindrical passage 59. Partially cooled and decompressed gas in cylindrical passage 59 flows axially in a direction away from permanent magnet motor/generator section 10, and then radially outward, and then axially in a direction toward permanent magnet motor/generator section 10 to passages 97 of recuperator 90, as indicated by gas flow arrows 108 and 109 respectively.

In an alternate embodiment of the present disclosure, low pressure catalytic reactor 80A may be included between fuel injector inlets 58 and recuperator 90. Low pressure catalytic reactor 80A may include internal surfaces (not shown) having catalytic material (e.g., Pd or Pt, not shown) disposed on them. Low pressure catalytic reactor 80A may have a generally annular shape defined by cylindrical inner surface 82 and cylindrical low pressure outer surface 84. Unreacted and incompletely reacted hydrocarbons in gas in low pressure catalytic reactor 80A react to convert chemically stored energy into additional heat, and to lower concentrations of partial reaction products, such as harmful emissions including nitrous oxides (NOx).

Gas 110 flows through passages 97 in recuperator 90 connecting from turbine exhaust 80 or catalytic reactor 80A to turbogenerator exhaust output 2, as indicated by gas flow arrow 112, and then exhausts from turbogenerator 1, as indicated by gas flow arrow 113. Gas flowing through passages 97 in recuperator 90 connecting from turbine exhaust 80 to outside of turbogenerator 1 exchanges heat to walls 98 of recuperator 90. Walls 98 of recuperator 90 heated by gas flowing from turbine exhaust 80 exchange heat to gas 22C flowing in recuperator 90 from compressor 40 to combustor 50.

Turbogenerator 1 may also include various electrical sensor and control lines for providing feedback to power controller 201 and for receiving and implementing control signals as shown in FIG. 2.

Alternative Mechanical Structural Embodiments of the Integrated Turbogenerator

The integrated turbogenerator disclosed above is exemplary. Several alternative structural embodiments are known.

In one alternative embodiment, air 22 may be replaced by a gaseous fuel mixture. In this embodiment, fuel injectors may not be necessary. This embodiment may include an air and fuel mixer upstream of compressor 40.

In another alternative embodiment, fuel may be conducted directly to compressor 40, for example by a fuel conduit connecting to compressor impeller housing 44. Fuel and air may be mixed by action of the compressor impeller 42. In this embodiment, fuel injectors may not be necessary.

In another alternative embodiment, combustor 50 may be a catalytic combustor.

In still another alternative embodiment, geometric relationships and structures of components may differ from those shown in FIG. 1A. Permanent magnet motor/generator section 10 and compressor/combustor section 30 may have low pressure catalytic reactor 80A outside of annular recuperator 90, and may have recuperator 90 outside of low pressure catalytic reactor 80A. Low pressure catalytic reactor 80A may be disposed at least partially in cylindrical passage 59, or in a passage of any shape confined by an inner wall of combustor 50. Combustor 50 and low pressure catalytic reactor 80A may be substantially or completely enclosed with an interior space formed by a generally annularly shaped recuperator 90, or a recuperator 90 shaped to substantially enclose both combustor 50 and low pressure catalytic reactor 80A on all but one face.

An integrated turbogenerator is a turbogenerator in which the turbine, compressor, and generator are all constrained to rotate based upon rotation of the shaft to which the turbine is connected. The methods and apparatus disclosed herein are preferably but not necessarily used in connection with a turbogenerator, and preferably but not necessarily used in connection with an integrated turbogenerator.

Control System

Referring now to FIG. 2, a preferred embodiment is shown in which a turbogenerator system 200 includes power controller 201 which has three substantially decoupled control loops for controlling (1) rotary speed, (2) temperature, and (3) DC bus voltage. A more detailed description of an appropriate power controller is disclosed in U.S. patent application Ser. No. 09/207,817, filed Dec. 8, 1998, (now U.S. Pat. No. 6,487,096), which is incorporated herein in its entirety by this reference.

Referring still to FIG. 2, turbogenerator system 200 includes integrated turbogenerator 1 and power controller 201. Power controller 201 includes three decoupled or independent control loops.

A first control loop, temperature control loop 228, regulates a temperature related to the desired operating temperature of primary combustor 50 to a set point, by varying fuel flow from fuel control element 50P to primary combustor 50. Temperature controller 228C receives a temperature set point, T*, from temperature set point source 232, and receives a measured temperature from temperature sensor 226S connected to measured temperature line 226. Temperature controller 228C generates and transmits over fuel control signal line 230 to fuel pump 50P a fuel control signal for controlling the amount of fuel supplied by fuel pump 50P to primary combustor 50 to an amount intended to result in a desired operating temperature in primary combustor 50. Temperature sensor 226S may directly measure the temperature in primary combustor 50 or may measure a temperature of an element or area from which the temperature in the primary combustor 50 may be inferred.

A second control loop, speed control loop 216, controls speed of the shaft common to the turbine 70, compressor 40, and motor/generator 10, hereafter referred to as the common shaft, by varying torque applied by the motor generator to the common shaft. Torque applied by the motor generator to the common shaft depends upon power or current drawn from or pumped into windings of motor/generator 10. Bi-directional generator power converter 202 is controlled by rotor speed controller 216C to transmit power or current in or out of motor/generator 10, as indicated by bi-directional arrow 242. A sensor in turbogenerator 1 senses the rotary speed on the common shaft and transmits that rotary speed signal over measured speed line 220. Rotor speed controller 216 receives the rotary speed signal from measured speed line 220 and a rotary speed set point signal from a rotary speed set point source 218. Rotary speed controller 216C generates and transmits to generator power converter 202 a power conversion control signal on line 222 controlling generator power converter 202's transfer of power or current between AC lines 203 (i.e., from motor/generator 10) and DC bus 204. Rotary speed set point source 218 may convert to the rotary speed set point a power set point P* received from power set point source 224.

A third control loop, voltage control loop 234, controls bus voltage on DC bus 204 to a set point by transferring power or voltage between DC bus 204 and any of (1) Load/Grid 208 and/or (2) energy storage device 210, and/or (3) by transferring power or voltage from DC bus 204 to dynamic brake resistor 214. A sensor measures voltage DC bus 204 and transmits a measured voltage signal over measured voltage line 236. Bus voltage controller 234C receives the measured voltage signal from voltage line 236 and a voltage set point signal V* from voltage set point source 238. Bus voltage controller 234C generates and transmits signals to bi-directional load power converter 206 and bi-directional battery power converter 212 controlling their transmission of power or voltage between DC bus 204, load/grid 208, and energy storage device 210, respectively. In addition, bus voltage controller 234 transmits a control signal to control connection of dynamic brake resistor 214 to DC bus 204.

Power controller 201 regulates temperature to a set point by varying fuel flow, adds or removes power or current to motor/generator 10 under control of generator power converter 202 to control rotor speed to a set point as indicated by bi-directional arrow 242, and controls bus voltage to a set point by (1) applying or removing power from DC bus 204 under the control of load power converter 206 as indicated by bi-directional arrow 244, (2) applying or removing power from energy storage device 210 under the control of battery power converter 212, and (3) by removing power from DC bus 204 by modulating the connection of dynamic brake resistor 214 to DC bus 204.

Combustor housing 39 of combustor 22 is illustrated in FIGS. 3–6, and generally includes a cylindrical outer liner 44 and a tapered inner liner 46 which, together with combustor dome 43, form a generally expanding annular combustion housing or chamber 39 from combustor dome 43 to the turbine 31. A plurality of fuel injector guides 49 position fuel injectors 14 to tangentially introduce a fuel/air mixture at the combustor dome 43 end of the annular combustion housing 39 along the fuel injector axis or centerline 47. The combustion dome 43 may be rounded out to permit the swirl pattern from the fuel injectors 14 to fully develop and also to reduce structural stress loads in the combustor.

A flow control baffle 48 extends from the tapered inner liner 46 into the annular combustion housing 39. The baffle 48, which may be generally skirt-shaped, may extend between one-third and one-half of the distance between the tapered inner liner 46 and the cylindrical outer liner 44. Multiple rows each of a plurality of spaced offset air dilution holes 52, 53, and 54 in the tapered inner liner 46 underneath the flow control baffle 48 introduce dilution air into the annular combustion housing 39. In a currently preferred embodiment of the present disclosure three rows of dilution holes 52, 53, and 54 are used. The first two (2) rows of air dilution holes 52 and 53 (closest to the fuel injector centerline 47) may be the same size with both, however, smaller than the third row of air dilution holes 54.

In addition, one or more rows each of a plurality of spaced air dilution holes 50 and 51 in the cylindrical outer liner 44 may introduce more dilution air downstream from the flow control baffle 48. In a currently preferred embodiment of the present disclosure two rows of dilution holes 50, and 51 are used. The plurality of holes 50 closest to the flow control baffle 48 may be larger and less numerous than the second row of holes 51.

Figure 6:
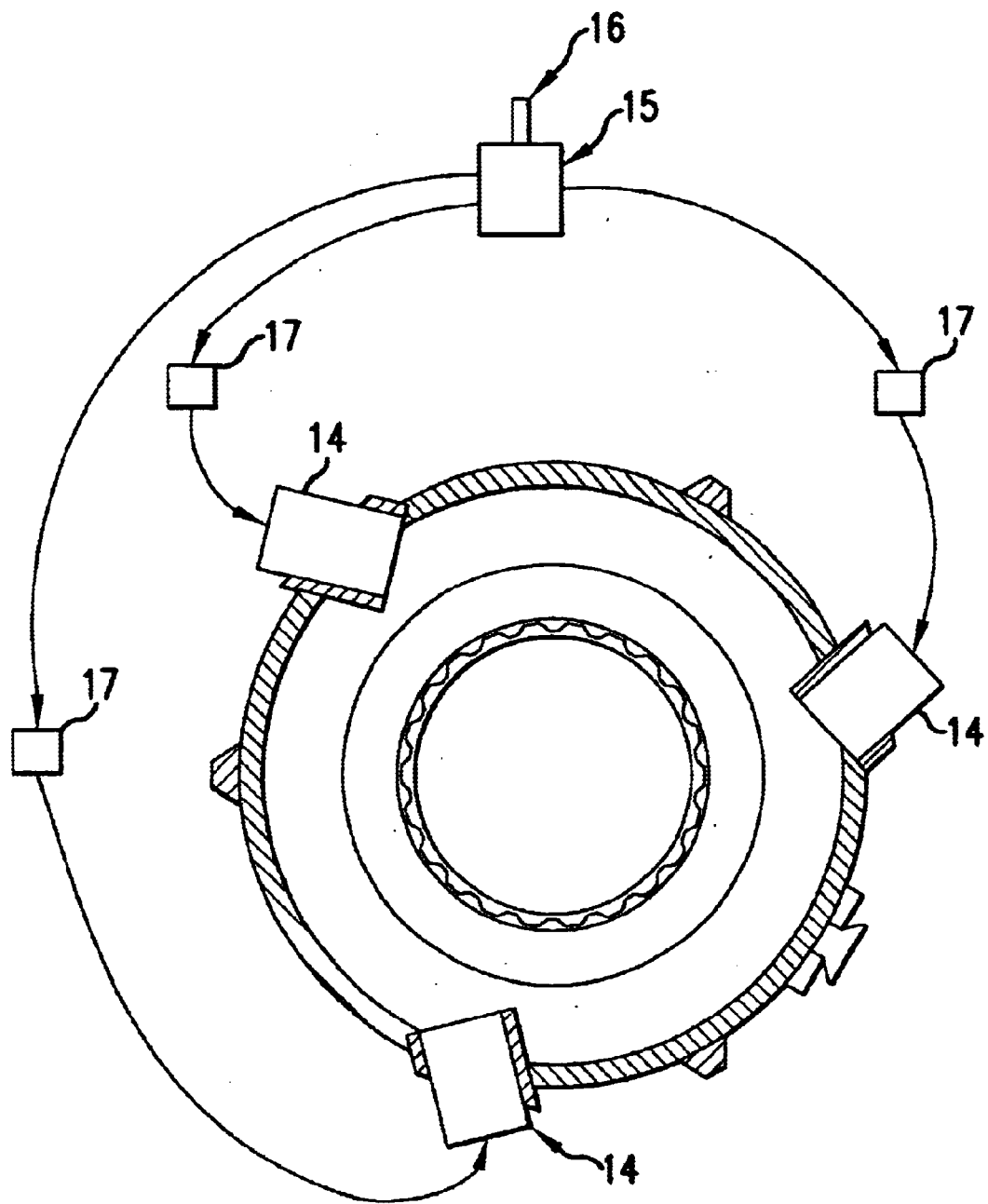
FIG. 6 is a cross section view of the combustor of FIG. 3 showing external fuel connections.

The combustor system of the present invention may operate on gaseous fuels, such as natural gas, propane, etc., liquid fuels, such as gasoline, diesel oil, etc., or may be designed to accommodate either gaseous or liquid fuels. Fuel may be provided individually to each fuel injector 14 or, as shown in FIG. 6, a fuel manifold 15 may be used to supply fuel to all three (3) fuel injectors 14. The fuel manifold 15 includes a fuel inlet 16 to receive fuel from a fuel source (not shown). Flow control valves 17 are provided in each of the fuel lines from the manifold 15 to fuel injectors 14. The flow control valves 17 may be individually controlled to an on/off position (to separately use any combination of fuel injectors individually) or they may be modulated together.

Figure 7:
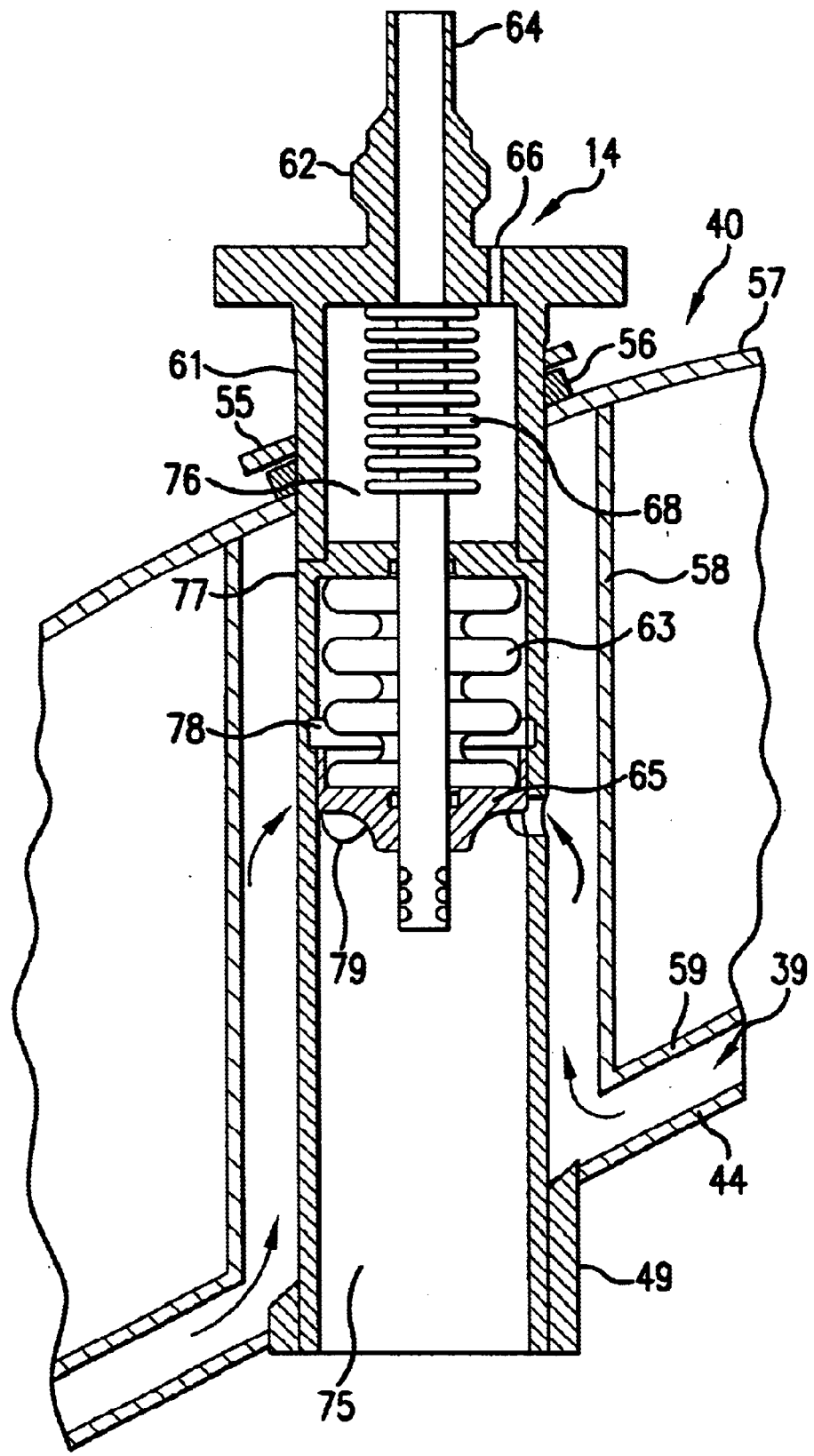
FIG. 7 is a cross sectional view of a fuel injector according to the present disclosure.

Referring to FIG. 7, the fuel injector 14 extending through the recuperator housing 40 and into the combustor housing 39 through a fuel injector guide 49. The fuel injector flange 55 is attached to a boss 56 on the outer recuperator wall 57. The fuel injector 14 extends through an angled tube 58 between the outer recuperator wall 57 and the inner recuperator wall 59, and through the fuel injector guide 49 in the cylindrical outer liner 44 of the combustor housing 39 into the interior of the annular combustion housing 39.

The fuel injector 14 generally includes an injector tube 61 having an inlet end 61A and a discharge end 61B. Inlet end 61A of injector tube 61 may also include a coupler 62 having a fuel inlet tube 64 that provides fuel to injector tube 61. Fuel inlet tube 64 may include a bellows section 68 that may accommodate differential thermal expansion between fuel inlet tube 64 and injector tube 61. A slider 65 may also be slidably located inside fuel injector 14 and loaded by a spring 63. The first end of spring 63 may be attached to the slider and the second end of spring 63 may be attached to a stopper 77. Plenum 76 may be connected to the atmosphere by a passage 66 and is generally at atmospheric pressure. In operation, pressure in mixing zone 75 of injector 14 would be generally higher than the pressure in plenum 76. Slider 65 may serve as a seal between plenum 76 and mixing zone 75. The spring 63 would generally be made of metal bellows that prevents leak through the interstice between the slider 65 and the fuel inlet tube 64.

The space between the angled tube 58 and the outer tube 61 would be open to the space between the inner recuperator wall 59 and the cylindrical outer liner 44 of the combustor housing 39. Heated compressed air from the recuperator 23 would be supplied to the space between the inner recuperator wall 59 and the cylindrical outer liner 44 of the combustor housing 39 and would thus be available to the interior of the angled tube 58.

The fuel injector tube 61 may have a plurality of holes 79 downstream of the slider 65. At start-up of a gas turbine engine employing an injector according to the present disclosure, slider 65 may cover some percentage of holes 79 that allow air into the mixing zone 75. The pressure in the combustor 22 varies directly with power of the engine; as the power of the engine increases, the pressure in the combustor 22 increases and as the power decreases the pressure decreases. An increase in internal pressure of the combustor increases the pressure differential across the slider 65 between plenum 76 and mixing zone 75. The increased pressure differential pushes the slider 65 towards plenum 76, resulting in an increase in percentage of holes 79 that are open and increasing the air feed into the mixing zone 75. The pressure-displacement characteristics of the spring, also known as the spring rate, would determine the correlation between the pressure in the combustor and the amount of air feed from holes 79 of injector 61.

The increase in power of the engine generally corresponds to an increase in fuel feed from the fuel inlet tube 64 into mixing zone 75. In an embodiment of the present disclosure, controller 13 signals an increase in fuel feed in response to an increase in power demand. A predetermined fuel-to-air ratio may be maintained in the mixing zone 75 from start-up to full power by correlating changes in fuel feed from fuel inlet tube 64 with changes in air feed from holes 79 of fuel injector tube 61.

According to another embodiment of the present disclosure, both the fuel feed and the air feed may vary with the internal pressure of combustor 22. The displacement of spring 63 in injector 14 would also depend on the internal pressure in combustor 22. By choosing an appropriate spring rate for spring 63 in injector 14, fuel-to-air ratio could be predetermined over the range of operating conditions and emissions minimized over the range. In another embodiment of the invention, the spring may be replaced with any electromechanical or mechanical device, for example a pneumatic device.

Figure 8:
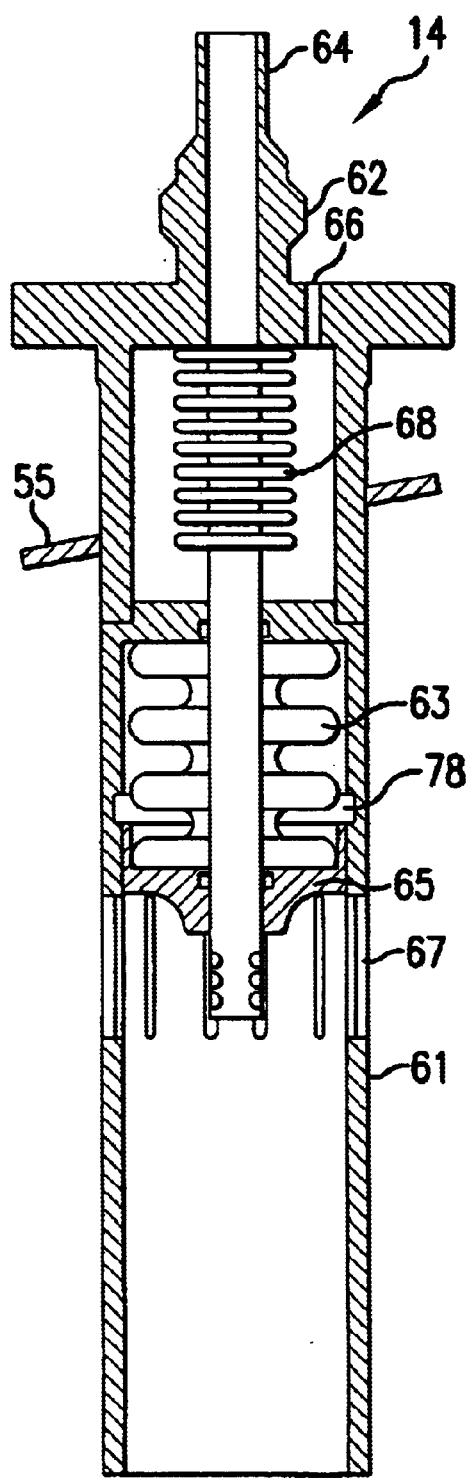
FIG. 8 is a cross sectional view of an alternate embodiment fuel injector according to the present disclosure.

According to another embodiment of the present disclosure illustrated in FIG. 8, a plurality of elongated slits 67 in the injector tube 61 downstream of the slider 65 would provide an entry for compressed air from the angled tube 58 to the fuel in the injector tube 61 downstream of the slider 65. These elongated slits may receive the compressed air from the angled tube 58 that receives compressed air from the space between the inner recuperator wall 59 and the cylindrical outer liner 44 of the combustor housing 39. The downstream face of the slider 65 may be sloped to help direct the compressed air entering the injector 61 in a downstream direction.

Figure 9:
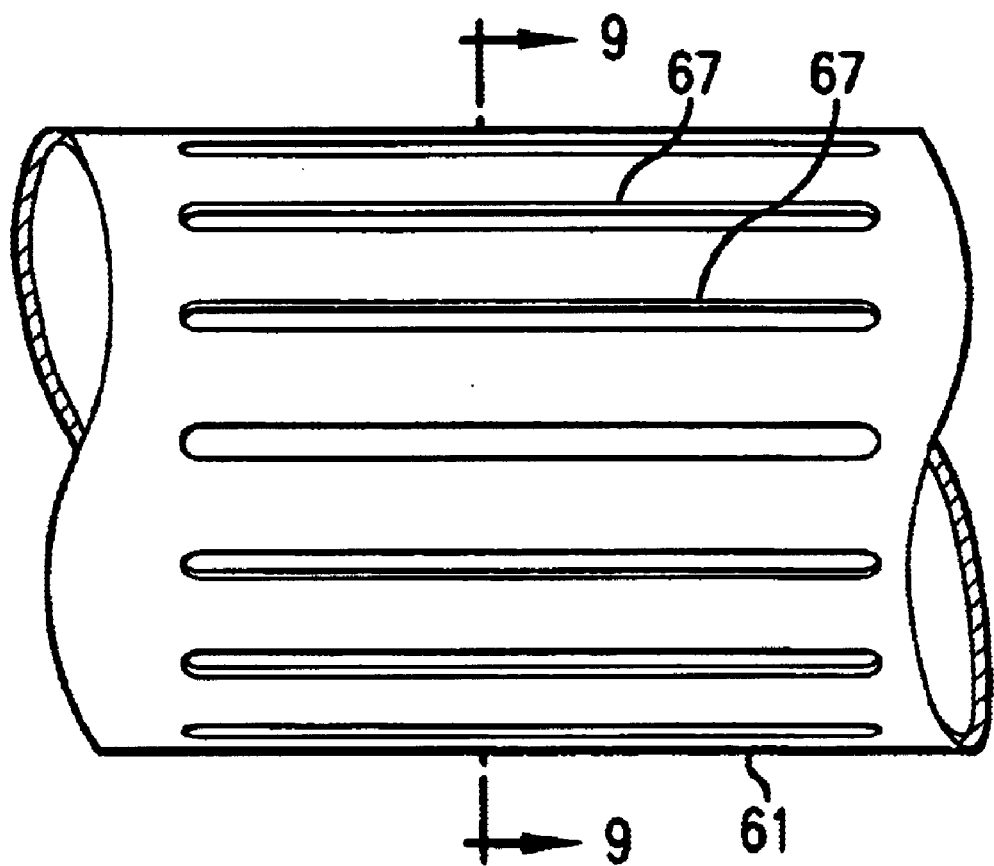
FIG. 9 is a side view of an injector tube according to the present disclosure.
Figure 10:
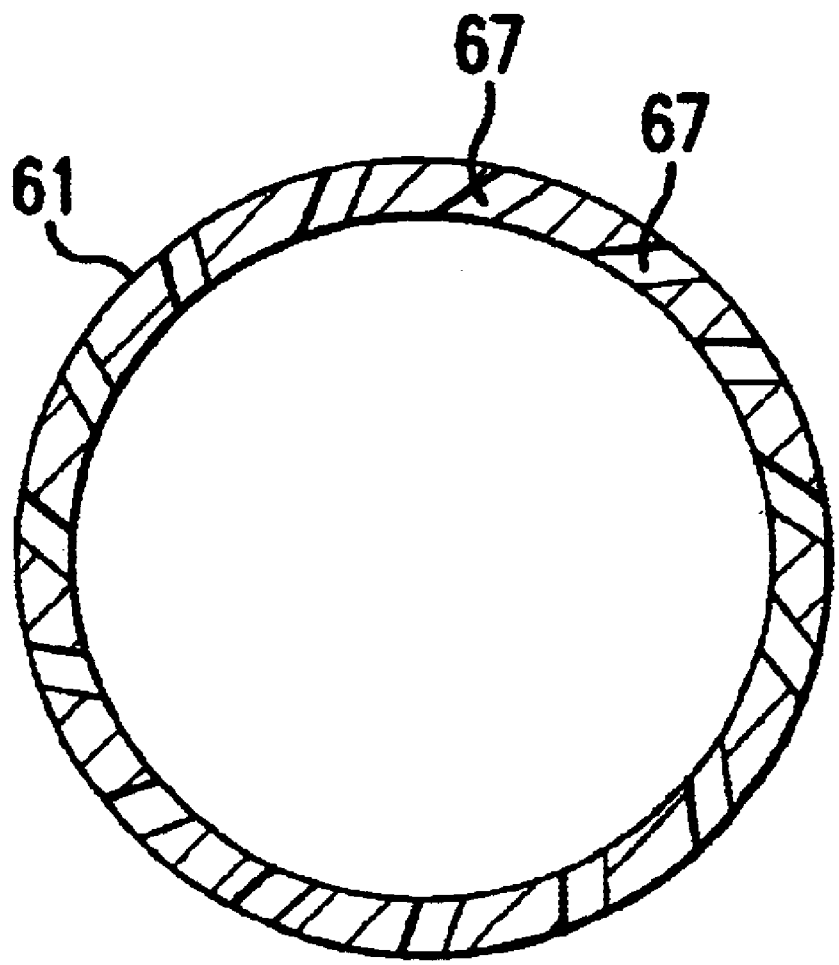
FIG. 10 is a cross sectional view of the injector tube of FIG. 9.
Figure 11:
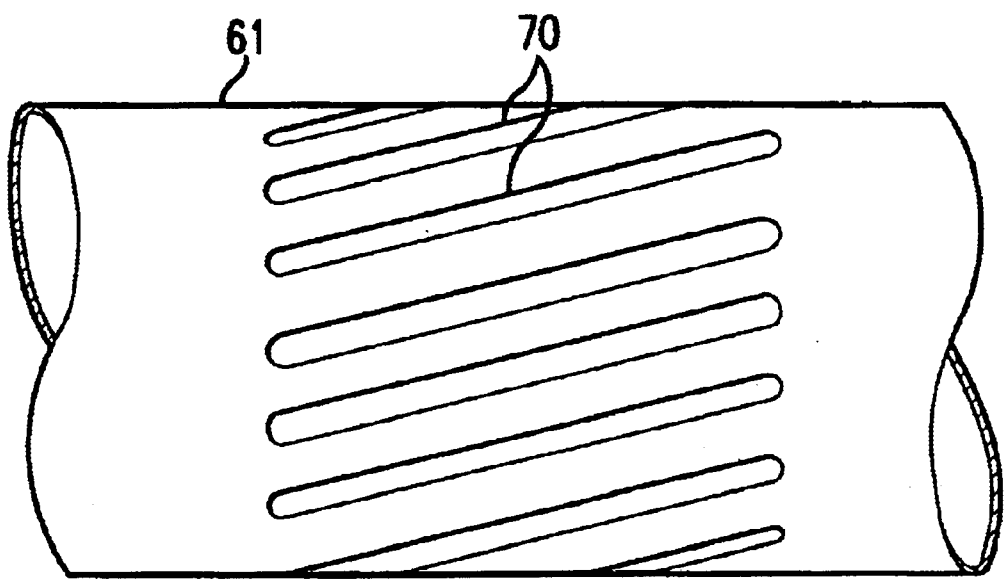
FIG. 11 is a side view of an alternate embodiment injector tube according to the present disclosure.

Elongated slits 67 are shown in more detail in FIGS. 9 and 10. While slits 67 generally extend parallel to the axis or centerline of the injector tube 61, they may be radially angled, that is the sidewalls of slits 67 are not radial but rather are angled. This angle would direct the compressed air to enter the injector tube 61 in a generally tangential direction to better mix with and swirl the fuel exiting from the fuel inlet tube 64 in the injector tube 61. Alternately, injector tube 61 may include elongated slits 70 that are angled from the axis or centerline of the injector tube 61 as shown in FIG. 11. The angled slits would serve to mix and swirl the fuel exiting from the fuel inlet tube 64 in the injector tube 61.

Figure 12:
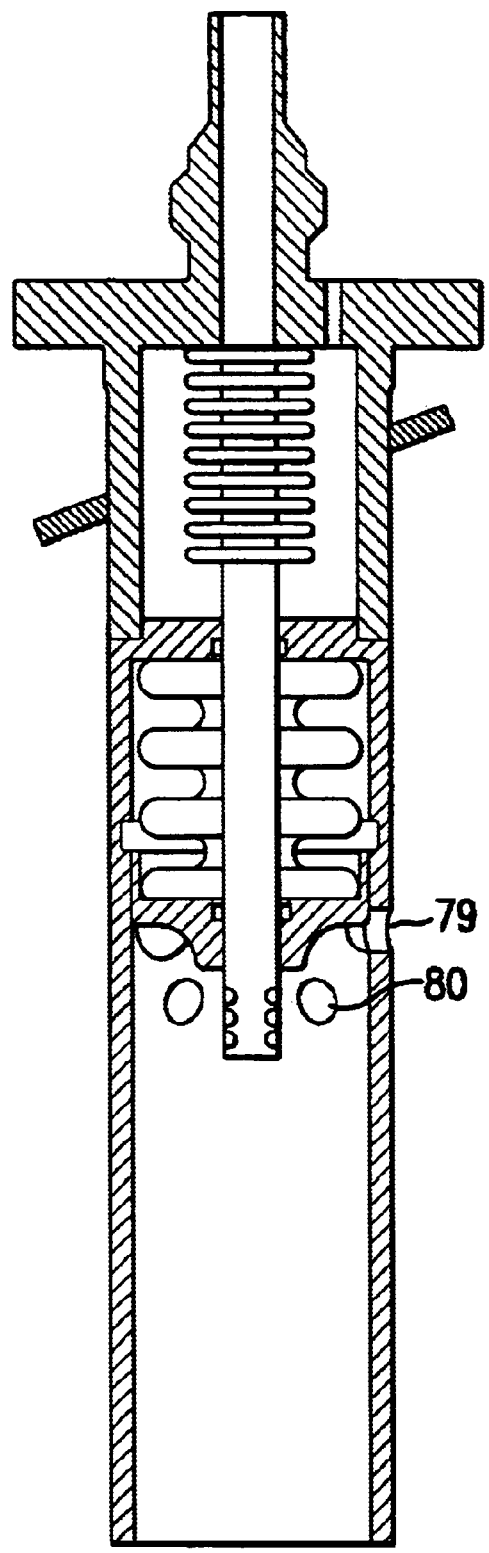
FIG. 12 is a cross sectional view of another alternate embodiment fuel injector according to the present disclosure.

As illustrated in FIG. 12, alternately, the fuel injector tube 61 of the fuel injector 14 includes plurality (shown two) of rows of offset holes 79 and 80. The diameters of the holes in one row may be different from diameters of holes in the other row. The first row of holes may be completely open from start-up to full power. The second row may be partially open with the slider covering a percentage of second row of holes. The first row of holes may provide air at start-up and as the power increases, the second row of holes may provide additional air. At or near full power, both the rows of holes may be fully open.

Having now described the invention in accordance with the requirements of the patent statutes, those skilled in this art will understand how to make changes and modifications in the present invention to meet their specific requirements or conditions. Such changes and modifications may be made without departing from the scope and spirit of the invention as set forth in the following claims.

I claim:

1. A turbogenerator system, comprising:
   a turbine mounted for rotation on a shaft;
   a motor/generator coupled with the shaft for rotation therewith;
   a combustor for combusting fuel and compressed air to generate combustion gases for rotating the turbine;
   a compressor providing compressed air;
   an injector having at least one opening comprising an elongated slit to admit the compressed air from the compressor, the injector connected to the combustor to inject fuel and compressed air into the combustor;
   a piston slidably covering the at least one opening to provide a variable entry to the compressed air; and
   a pressure actuator associated with the piston and responsive to pressure in the combustor for determining a size of the variable entry.

2. The turbogenerator system of claim 1, wherein the injector further comprises a long axis and the elongated slit is parallel to the long axis of the injector.

3. The turbogenerator system of claim 1, wherein the injector further comprises a long axis and the elongated slit is at an angle to the long axis of the injector.

4. The turbogenerator system of claim 1, wherein the size of the variable entry is adjusted by sliding the piston during operation of the turbogenerator system to maintain a desired fuel-to-air ratio in a mixing zone of the injector.

5. The turbogenerator system of claim 1, wherein the pressure actuator further comprises a spring.

6. The turbogenerator system of claim 1, wherein the pressure actuator further comprises a metal bellows.

7. The turbogenerator system of claim 5, wherein the spring is preloaded for maintaining a preselected size of the variable entry at the start of operation of the combustor.

8. The turbogenerator system of claim 1, wherein the combustor comprises an inner liner and an outer liner, and the inner liner includes one or more rows of air dilution holes.

9. The turbogenerator system of claim 8,
   wherein the outer liner includes one or more rows of air dilution holes.

10. A turbogenerator system, comprising:
    a combustor; and
    a plurality of injectors, coupled to the combustor, that inject fuel and compressed air into the combustor, wherein each of the plurality of injectors comprises
    an elongated slit that admits compressed air,
    a piston, slidably covering the elongated slit, that provides a variable entry to compressed air, and
    a pressure actuator responsive to pressure in the combustor that determines a size of the variable entry.

11. The turbogenerator system of claim 10, wherein each of the plurality of injectors further comprises a long axis and the elongated slit is parallel to the long axis of the injector.

12. The turbogenerator system of claim 10, wherein each of the plurality of injectors further comprises a long axis and the elongated slit is at an angle to the long axis of the injector.

13. The turbogenerator system of claim 10, wherein for each injector the size of the variable entry is adjusted by sliding the piston during operation of the turbogenerator system to maintain a desired fuel-to-air ratio in a mixing zone of the injector.

14. The turbogenerator system of claim 10, wherein each of the pressure actuators comprises a bellows.

15. The turbogenerator system of claim 10, wherein each of the pressure actuators comprises a spring.

16. The turbogenerator system of claim 15, wherein for each injector the spring is preloaded for maintaining a preselected size of the variable entry at the start of operation of the combustor.

17. The turbogenerator system of claim 10, wherein the combustor comprises an inner liner and an outer liner, and the inner liner includes one or more rows of air dilution holes.

18. The turbogenerator system of claim 17, wherein the outer liner includes one or more rows of air dilution holes.

19. A turbogenerator system, comprising:
    a combustor; and
    a plurality of injectors, coupled to the combustor, that inject fuel and compressed air into the combustor,
    wherein each of the plurality of injectors comprises
    an opening that admits compressed air,
    a piston, slidably covering the opening, that provides a variable entry to compressed air, and
    a pressure actuator, responsive to a difference in pressure between atmospheric pressure and a pressure in the combustor, that determines a size of the variable entry.

20. The turbogenerator system of claim 19, wherein for each injector the size of the variable entry is adjusted by sliding the piston during operation of the turbogenerator system to maintain a desired fuel-to-air ratio in a mixing zone of the injector.

21. The turbogenerator system of claim 19, wherein each of the pressure actuators comprises a bellows.

22. The turbogenerator system of claim 19, wherein each of the pressure actuators comprises a spring.

23. The turbogenerator system of claim 22, wherein for each injector the spring is preloaded for maintaining a preselected size of the variable entry at the start of operation of the combustor.

24. The turbogenerator system of claim 24, wherein the combustor comprises an inner liner and an outer liner, and the inner liner includes one or more rows of air dilution holes.

25. The turbogenerator system of claim 24, wherein the outer liner includes one or more rows of air dilution holes.

* * * * *